(12) United States Patent
Fernstrom

(10) Patent No.: US 8,108,773 B2
(45) Date of Patent: Jan. 31, 2012

(54) METHOD AND APPARATUS FOR GENERATING INSTANCES OF DOCUMENTS

(75) Inventor: Christer Fernstrom, St-ismier (FR)

(73) Assignee: Xerox Corporation, Norwalk, CT (US)

( * ) Notice: Subject to any disclaimer, the term of this patent is extended or adjusted under 35 U.S.C. 154(b) by 1868 days.

(21) Appl. No.: 11/013,368

(22) Filed: Dec. 17, 2004

(65) Prior Publication Data
US 2006/0136809 A1 Jun. 22, 2006

(51) Int. Cl.
*G06F 17/00* (2006.01)

(52) U.S. Cl. ........ 715/273; 715/200; 715/205; 715/208; 715/234; 715/248; 715/249; 715/255

(58) Field of Classification Search ............... 715/501.1, 715/513, 522–523, 500, 200, 205, 208, 234, 715/248, 249, 255, 273
See application file for complete search history.

(56) References Cited

U.S. PATENT DOCUMENTS

| | | | |
|---|---|---|---|
| 5,845,303 A * | 12/1998 | Templeman | 715/517 |
| 6,006,242 A | 12/1999 | Poole et al. | 707/531 |
| 6,012,071 A * | 1/2000 | Krishna et al. | 715/522 |
| 6,230,173 B1 | 5/2001 | Ferrel et al. | |
| 6,340,931 B1 | 1/2002 | Harrison et al. | 340/572.1 |
| 6,342,830 B1 | 1/2002 | Want et al. | 340/10.1 |
| 6,377,956 B1 | 4/2002 | Hsu et al. | 707/104.1 |
| 6,422,474 B1 | 7/2002 | Gossweiler, III et al. | 235/492 |
| 6,446,208 B1 | 9/2002 | Gujar et al. | 713/185 |
| 6,542,083 B1 | 4/2003 | Richley et al. | 340/852.49 |
| 6,573,916 B1 | 6/2003 | Grossweiler, III et al. | 345/850 |
| 6,578,192 B1 | 6/2003 | Boehme et al. | 717/115 |
| 2002/0152197 A1 | 10/2002 | Stocker et al. | |
| 2003/0079177 A1* | 4/2003 | Brintzenhofe et al. | 715/500 |
| 2004/0015567 A1 | 1/2004 | Ziebold et al. | |

OTHER PUBLICATIONS

Anonymous: "White Paper: X-Hive/Docato—A Technical Introduction", X-Hive Corporation, Rotterdam, NL, Jun. 2003, pp. 1-20.
Anonymous: "White Paper: Component Content Management, a better way of managing digital data", X-Hive Corporation, Sep. 2004, pp. 1-5.
"Deep Hypertext: The Xanadu® Model", available on the Internet at xanadu.com, Oct. 2004.
Kaj Gronhaek and Randell H. Trigg. "From Web to Workplace", MIT Press, pp. 43-149 1999.
Frank Halasz and Mayer Schwartz, "The dexter hypertext reference model", Communications of the ACM, 2(37), 1994.
Theodor Hoim Nelson, Project Xanadu, and Keio University, "Xanalogical Structure, Needed Now More than Ever: Parallel Documents, Deep Links to Content, Deep Versioning and Deep Re-Use", available on the Internet at xanadu.com, printed Oct. 29, 2004.

* cited by examiner

*Primary Examiner* — Amelia Rutledge
*Assistant Examiner* — David Faber
(74) *Attorney, Agent, or Firm* — Oliff & Berridge, PLC

(57) ABSTRACT

A composition model, which specifies a set of all possible facets that may be used to render a composition template, is used to bind unresolved elements in the composition template with a set of document components in a container. Different instances of a rendered document are produced by altering the set of document components in the container and using the composition model to re-bind the unresolved elements in the composition template with the document components in the altered set of document components in the container.

20 Claims, 14 Drawing Sheets

```
302
<header>
    <family>AudioPro_System</family>
    <title>AudioPro System Five</title>
    <provisions>
        <provision>audio system</provision>
    </provisions>
    <anchors>
        <anchor>overview</anchor>
        <anchor>SystemParts</anchor>
    </anchors>
    <one-liner>
        AudioPro System 5 audio
        system for powered vehicles.
    </one-liner>
    <attributes>
        <attribute>water_resistant</attribute>
    </attributes>
</header>
<body>
        <anchor id="overview">

{unresolved element}
        </anchor>

<anchor id="SystemParts">
        {unresolved element}

</anchor>
</body>
```

*FIG. 3*

Overview
   Your Smart-T car has been developed with urban users in mind. It features very low energy consumption, and combines a high-level of security with smallest size and modern stylish design. It comes equipped with:
   - GPL Engine EG-52 motor,
   - For your travel experience, it also features the advanced Audio System AS-300 audio system.

Overview of System Parts
   Audio System AS-300
   Overview
   The AS-300 audio system has been especially designed for noisy environments (cars, boats, teenager rooms). It consists of the following components:
   - Amplifier Max-AMP
   - Speaker Maxi

GPL Engine EG-52
   Overview
   The EG-52 is a low cost GPL engine, which has been especially designed for urban environments, due to its minimal levels of particle emission.

*FIG. 6*

Overview
> Your Smart-T car has been developed with urban users in mind. It features very low energy consumption, and combines a high-level of security with smallest size and modern stylish design. It comes equipped with:
> - Diesel Engine DE:530 motor,
> - For your travel experience, it also features the advanced Audio System AS-300 audio system.

Overview of System Parts
> Audio System AS-300
> Overview
> The AS-300 audio system has been especially designed for noisy environments (cars, boats, teenager rooms). It consists of the Radio Forte radio tuner and the following other components:
> - Amplifier Max-AMP
> - CD Player CD/X
> - Speaker Maxi
>
> Diesel Engine DE:530
> Overview
> The DE:530 is a low cost high-power diesel engine, which has been especially designed for trucking heavy loads in mountain areas.

*FIG. 7*

```xml
<?xml version="1.0"?>
<recomdoc>
  <header>
    <title>Smart - T</title>
    <family>Smart_T</family>
    <provisions>
      <provision>car</provision>
    </provisions>
    <one-liner>Trendy car for urban environments</one-liner>
    <anchors>
    <anchor>all</anchor>
    <anchor>overview</anchor>
    <anchor>SystemParts</anchor>
    </anchors>
  </header>
  <body>
  <anchor id="all">
    <anchor id="overview">
      <section title="Overview">
        <p>Your Smart-T car has been developed with urban users
           in mind. It features very low energy consumption, and
           combines a high-level of security with smallest size
           and modern stylish design. It comes equipped with:
           <ul> <transclude> <![CDATA[
                 engine=theDocuments.lookup('provisions','engine')
                 if engine:
                    theTxt = '<li>'+engine[0].title+'motor,</li>'
                    insertTxt(theTxt)]]> </transclude>
                <transclude> <![CDATA[audiosystem =
                   theDocuments.lookup('provisions','audio system')
                   if audiosystem:
                      theTxt = "<li> For your travel experience,
                         it also features the advanced "
                      theTxt += audiosystem[0].title+ " audio
                         system.</li>"
                      insertTxt(theTxt)]]> </transclude>
           </ul>
        </p>
      </section>
    </anchor>
    <anchor id="SystemParts">
      <section title="Overview of System Parts">
        <transclude> <![CDATA[for component in theDocuments.lookup
        ('provisions',theStructure.offsprings('car',1)):
             insertTxt('<section title="'+component.title+'">')
             insertTxt(component.getAnchor("overview"))
             insertTxt('</section>')]]>
        </transclude>
      </section>
    </anchor>
  </anchor>
  </body>
</recomdoc>
```

```xml
<?xml version="1.0"?>
  <recomdoc>
    <header>
      <title>GPL Engine EG-52</title>
      <family>Smart_T</family>
      <provisions>
        <provision>engine</provision>
      </provisions>
      <one-liner>Low-cost GPL engine.</one-liner>
      <anchors>
        <anchor>overview</anchor>
      </anchors>
    </header>
    <body>
      <anchor id="overview">
        <section title="Overview">
           <p>The EG-52 is a low cost GPL engine, which has
              been especially designed for urban environments,
              due to its minimal levels of particle emission.
           </p>
        </section>
      </anchor>
    </body>
</recomdoc>
```

```xml
<?xml version="1.0"?>
  <recomdoc>
    <header>
      <title>Diesel Engine DE:530</title>
      <family>Smart_T</family>
      <provisions>
        <provision>engine</provision>
      </provisions>
      <one-liner>High power diesel engine.</one-liner>
      <anchors>
        <anchor>overview</anchor>
      </anchors>
    </header>
    <body>
      <anchor id="overview">
        <section title="Overview">
           <p>The DE:530 is a low cost high-power diesel
              engine, which has been especially designed for
              trucking heavy loads in mountain areas.</p>
        </section>
      </anchor>
    </body>
</recomdoc>
```

FIG. 10

```xml
<?xml version="1.0"?>
<recomdoc>
  <header>
    <title>Audio System AS-300</title>
    <family>Smart_T</family>
    <provisions>
      <provision>audio system</provision>
    </provisions>
    <anchors>
      <anchor>all</anchor>
      <anchor>overview</anchor>
      <anchor>SystemParts</anchor>
    </anchors>
    <one-liner>An audio system for noisy environments.</one-liner>
  </header>
  <body>
    <anchor id="all">
      <anchor id="overview">
        <section title="Overview">
          <p>The AS-300 audio system has been especially designed
             for noisy environments (cars, boats, teenager rooms).
             <transclude> <![CDATA[radiocomp=theDocuments.lookup
                ('provisions','radio')
             if radiocomp:
                insertTxt('It consists of the ')
                insertTxt(radiocomp[0].title)
                insertTxt(' radio tuner and the following other
                   components:')
             else:
                insertTxt('It consists of the following
                   components:')
             ]]> </transclude> </p>
          <ul> <transclude> <![CDATA[for component in
                theDocuments.lookup('provisions',
                theStructure.offsprings('audio system',1)):
             if not('radio' in component.provisions):
                insertTxt('<li>' + component.title + '</li>')]]>
          </transclude> </ul>
        </section>
      </anchor>
      <anchor id="SystemParts">
        <section title="System Parts">
          <transclude> <![CDATA[for component in theDocuments.lookup
             ('provisions',theStructure.offsprings('audio system',1)):
             insertTxt('<section title="'+component.title+'">')
             insertTxt(component.getAnchor("all"))
             insertTxt('</section>')]]>
          </transclude>
        </section>
      </anchor>
    </anchor>
  </body>
</recomdoc>
```

*FIG. 11*

```xml
<?xml version="1.0"?>
 <recomdoc>
  <header>
    <title>Radio Forte</title>
    <family>Smart_T</family>
    <provisions>
       <provision>radio</provision>
    </provisions>
    <anchors>
       <anchor>all</anchor>
       <anchor>overview</anchor>
    </anchors>
    <one-liner>High-sensitive radio tuner.</one-liner>
  </header>
  <body>
    <anchor id="all">
       <anchor id="overview">
       <section title="Overview">
         <p>The Radio Forte is a very sensitive radio with extremely
            good signal/noise ratio.</p>
       </section>
       </anchor>
    <section title="Technical Specification">
         <p>The Radio Forte is an all-transistor super heterodyne
            receiver which provides a number of interesting
            capabilities, such as stereo reception, automatic
            squelch, and automatic frequency adjustment control. It
            is also very nice to look at.</p>
         <img src="radio.jpg" align="center" width="100"/>
    </section>
    </anchor>
  </body>
</recomdoc>
```

*FIG. 12*

```xml
<?xml version="1.0"?>
<recomdoc>
 <header>
   <title>Speaker Maxi</title>
   <family>Smart_T</family>
   <provisions>
     <provision>speaker</provision>
   </provisions>
   <anchors>
     <anchor>all</anchor>
     <anchor>overview</anchor>
   </anchors>
   <one-liner>High-performance load speaker</one-liner>
 </header>
 <body>
   <anchor id="all">
   <anchor id="overview">
     <section title="Overview">
       <p>The Speaker Maxi loudspeakers are high performance
          loudspeakers suitable for very noisy environments.</p>
     </section>
   </anchor>
     <section title="Technical data">
       <p>The speakers combine high impedance with extremely low
          sensitivity to variations in the amplifier's output
          impedance. They are nicely colored red with a weight of
          160Kg.</p>
       <img src="sp.jpg" align="center" width="100"/>
     </section>
   </anchor>
 </body>
</recomdoc>
```

FIG. 13

```
<?xml version="1.0"?>
 <recomdoc>
  <header>
    <title>CD Player CD/X</title>
    <family>Smart_T</family>
    <provisions>
      <provision>cd-player</provision>
    </provisions>
    <anchors>
      <anchor>all</anchor>
      <anchor>overview</anchor>
    </anchors>
    <one-liner>CD Player for Audio CDs, compatible MP3.</one-liner>
  </header>
  <body>
    <anchor id="all">
    <anchor id="overview">
      <section title="Overview">
        <p>CD player for CD-R/W compatible with audio files, MP3 and
           AIFF.</p>
      </section>
    </anchor>
      <section title="Technical specification">
        <p>The CD/X is a CD player that accepts CD-R/W with numerous
           different formats, including audio files, MP3, CDV, CDI
           and MPEG-4. It has been designed for bumpy environments
           and includes a 10 MByte solid state buffer memory.</p>
        <img src="cd.jpg" align="center" width="100"/>
      </section>
    </anchor>
  </body>
</recomdoc>
```

```
<?xml version="1.0"?>
 <recomdoc>
  <header>
    <title>Amplifier Max-AMP</title>
    <family>Smart_T</family>
    <provisions>
      <provision>amplifier</provision>
    </provisions>
    <anchors>
      <anchor>all</anchor>
      <anchor>overview</anchor>
    </anchors>
    <one-liner>Solid state HI-FI amplifier</one-liner>
  </header>
  <body>
    <anchor id="overview">
      <section title="Overview">
        <p>The Max-AMP solid state amplifiers are designed to work
           in a range of temperatures and tough conditions. In
           particular it supports over 10G acceleration forces,
           allowing it to survive a car crash that would leave no
           survivors.</p>
      </section>
    </anchor>
  </body>
</recomdoc>
```

FIG. 16

```
struct=\
   ['car',
     ['engine',
       ['carburettor',
        'gasket'
       ], ],
     ['transmission',
       ['gear case',
        'clutch'
       ], ],
     ['audio system',
       ['radio',
        'amplifier',
        'speaker',
        'cd-player',
        'md-player'
       ],
      'cabin'
     ]
   ]
```

METHOD AND APPARATUS FOR GENERATING INSTANCES OF DOCUMENTS

BACKGROUND AND SUMMARY

The following relates generally to the field of document management and more particularly to methods, and apparatus therefor, for generating instances of documents using a component-based model.

Generally, the use of components as building blocks for developing an assorted number of products is known. For example, component-based design and fabrication of hardware and software systems allows the combination of component parts to be formulated in different ways. One feature of hardware and software component-based design and fabrication is the use of a common interface to allow alternate pluggable units. For example, two components may provide the same function through a common interface but do so using a different configuration or component parts (e.g., more memory, faster processor, etc.).

Further, defining and using components as building blocks for documents is also known. The development of modular and dynamic documents can be carried out using hypertext systems to establish relationships between document parts using hyperlinks, or dynamic content management system (e.g., Active Server Pages, PHP, or XSLT) that provide ways to handle dynamic information via queries inserted into documents. Further, dynamic documents may be produced using transformation mechanisms that may be used to transform documents in one form to another (e.g., transforming an XML document that follows one style sheet or document type definition (DTD) to create another XML document that follows another style sheet or DTD).

One disadvantage with known hypertext systems is that they are tightly coupled, with links pointing to specific documents; that is, if a document is added or removed in a collection, the links that are present in other documents will not be updated to reflect the change. Some hypertext systems only define one link traversal operation (i.e., "load document"), while other hypertext systems provide other traversal operations such as inclusion. In contrast, one disadvantage with dynamic content management systems is that such systems rely on executing queries to a database on a server, thereby requiring information to be centralized in such a database for the system to operate.

Accordingly, there exists a continued need for improved systems that dynamically render documents using a component-based model which addresses these and other shortcomings. Advantageously, such improved systems would permit the re-combination of document components while not relying on a centralized service. Further, such improved systems would advantageously operate with document components that contain sufficient embedded information and processing capabilities to permit independent (i.e., distributed and self-contained) re-combination, thereby allowing the possibility of re-combining the same instance of a document at various independent locations using different sets of components.

In accordance with the various embodiment set forth herein, there is provided a document management system for combining document components in different ways. That is generally, there is provided a method for defining, producing, and using re-combinable document components. A re-combinable document is defined herein as a component-based document that may be rendered in many different forms, where components of the document may cause the combination of other components. Combinations of components may be chosen based on various criteria and the composition (i.e., rendering) of a document may be performed either statically or dynamically, in order to adapt to a new context.

Advantageously, the document management system may be used to manage the documentation of physical objects that consist of a large number of components, where each individual object may be composed of one of a plurality of combinations of components, and where the constituent components and their sub-components may evolve and reconfigure in time. Further, the document management system advantageously takes into account component dependencies (i.e., where the addition, removal, or replacement of one component may influence the documentation of other components), while at the same time the system maintains a loose coupling between document parts (i.e., a document with little or no direct dependencies between components is referred to herein as being "loosely coupled").

By applying the various methods described herein to combine, document components, a rendered document is created that includes a unique set of selected document components, each one of which may be adapted according to the other document components. That is, the various methods permit automatic adaptation of a document component according to the context in which it is used. Further, the various methods may rely on linguistic processing to refine and correct the textual content of the rendered document, for example, by verifying agreement related to number and gender for nouns, and person and tense for verbs.

In accordance with one aspect of the various methods described herein, document components define variable data by exporting one or more anchor points to which other document components may reference. In accordance with this and other aspects, document components explicitly declare interfaces that specify what they describe in accordance with an agreed terminology, and provide various de-referencing operations to transform a reference into a unidirectional hyperlink, or to permit the inclusion of document content. Such de-referencing can advantageously be controlled and conditioned depending on the context in which each document component is used. In accordance with further aspects of the various methods described herein, a composition model and composition template control the construction of an instance of a rendered document using a set of document components, while maintaining a loose coupling between document components through reference lookup functions exported through their interfaces.

In accordance with yet another aspect of the methods described herein, physical systems or articles are equipped with smart tags, which contain information for processing or supporting the automatic reconfiguration of related documents in accordance with the methods described herein. Advantageously, this aspect permits documentation to be automatically updated to reflect new configurations of component-based physical objects (e.g., in the event a component part is added, removed or exchanged, the documentation will be automatically updated to reflect the new configuration of the object).

In accordance with yet further aspects of the methods described herein, there is provided a method for generating instances of documents that includes: defining a container with a set of document components; defining a composition template that specifies one or more unresolved elements; defining a composition model that specifies a set of all possible facets that may be used to render the composition template; using the composition model to bind the unresolved elements in the composition template with the set of document components in the container; producing different instances of a rendered document by (i) altering the set of document components in the container and (ii) using the composition model to re-bind the unresolved elements in the composition template with the document components in the altered set of document components in the container.

BRIEF DESCRIPTION OF THE DRAWINGS

These and other aspects of the disclosure will become apparent from the following description read in conjunction with the accompanying drawings wherein the same reference numerals have been applied to like parts and in which:

FIG. 3 illustrates an example of a document component;

FIG. 6 illustrates a rendered document using the document components shown in FIGS. 9, 11, 13, and 15;

FIG. 7 illustrates a rendered document using the document components shown in FIGS. 10, 11, 12, 13, 14, and 15;

FIG. 8 illustrates a composition template used to render the document shown in FIGS. 6 and 7;

FIGS. 9-15 illustrate different document components that may be added or removed to a container; and FIG. 16 illustrates a composition model referred to by the composition template shown in FIG. 8 to render the documents shown in FIGS. 6 and 7.

DETAILED DESCRIPTION

The table that follows set forth definitions of terminology used throughout the specification, including the claims and Figures.

| Term | Definition |
| --- | --- |
| CDATA | Character data that is ignored by an XML parser |
| PHP | PHP Hypertext Preprocessor |
| RFID | Radio Frequency IDentification |
| XML | EXtensible Markup Language |
| <li> </li> | An XML tag that defines the start and end of a list item, respectively |
| <p> </p> | An XML tag defines the start and end of a paragraph, respecitvely |
| <ul> </ul> | An XML tag that defines the start and end of an unordered list, respectively |
| XSLT | Extensible Stylesheet Language Transformations |

A. Operating Environment

Figure 1:
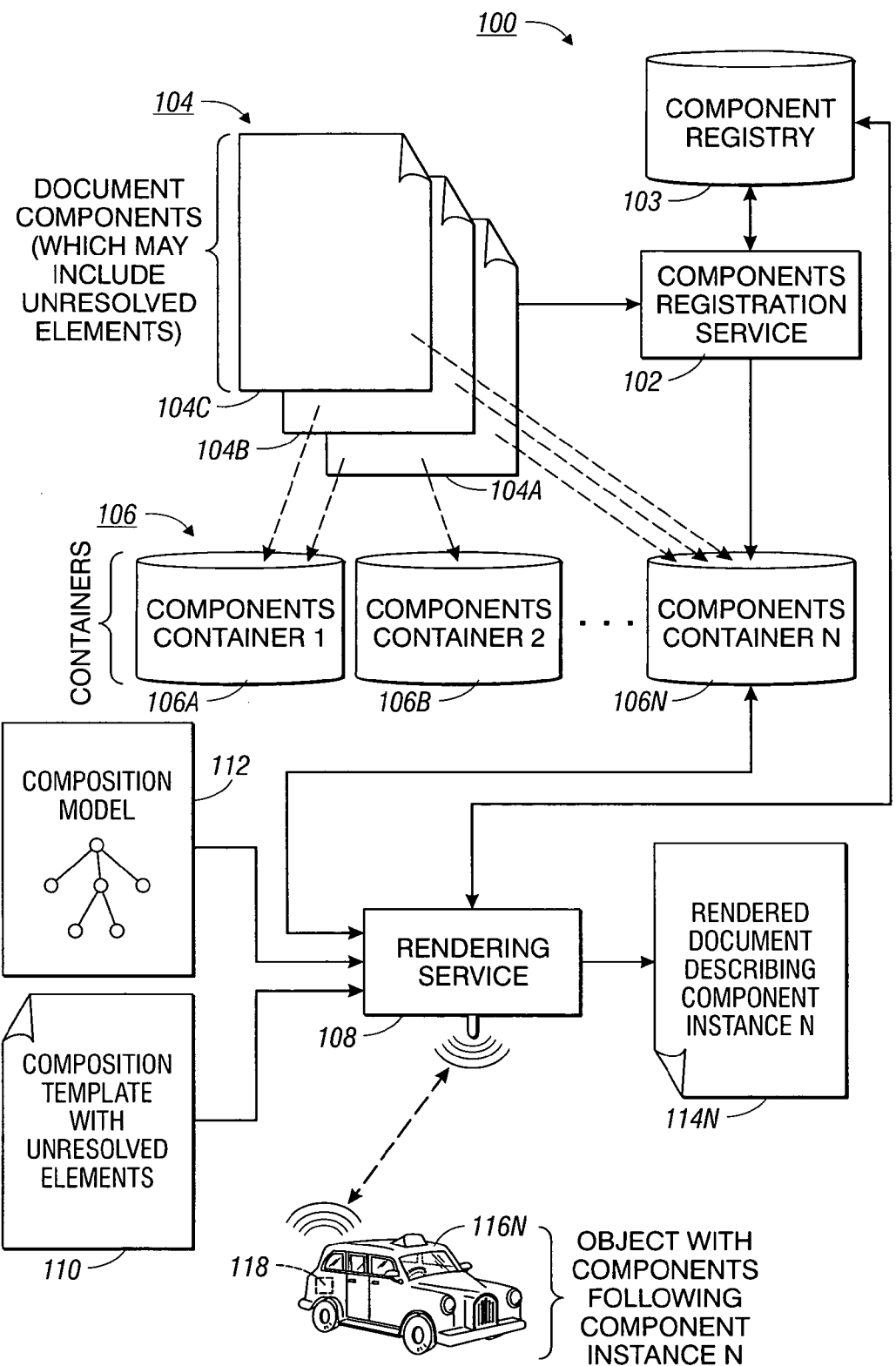
FIG. 1 illustrates a document management system adapted to render instances of documents describing objects made up of a unique collection of components.

FIG. 1 illustrates one embodiment of a document management system 100 adapted to render documents describing objects made up of a unique collection of components. The operating elements of the embodiment shown in FIG. 1 include a component registration service 102, which registers document components 104 in a component registry 103, components containers 106 that store a set of document components 104, and a rendering service 108, which takes as input for each rendering of a document instance 114: a composition template 110, a composition model 112, and a components container 106. Each rendered document instance 114 is constructed using content that corresponds to document components 104 specified in a components container 106.

As shown in FIG. 1, a rendered document instance 114N is constructed from a set of document components 104, where each component is stored in a components container 106N (similarly, another document instance may be rendered using the document components in the components container 106). Each components container 106 thus provides two functions, first it stores available document components for a rendered document instance 114, and second its document components are used (in part or in whole) to provide transitive closure from the root document component 104 by dereferencing unresolved elements therein.

The component registration service 102, which may operate to service one or more components containers 106, is adapted to create or modify the set of document components 104 that make up each components container 106. In one embodiment, each components container 106 has a component registration service 102 associated with it. Advantageously, as components for an object 116 change, a rendered document describing it may be newly produced once the document component 104 corresponding to the component of the object is updated (e.g., an old document component is removed and a new document component is added) in its corresponding components container 106. For example, FIG. 1 illustrates that the document component 104A is registered in components containers 106A, 106B, and 106N, whereas the document component 104B is registered in components containers 106A and 106N and the document component 104C is registered only in components container 106N. Each document component may contain one or more unresolved elements that are resolved by the rendering service 108.

The rendering service 108 is adapted to generate (or construct) a plurality of rendered document instances 114N using a single composition template 110 and a single composition model 112, where each rendered document instance 114 is built up from the current set of document components 104 in a components container 106. The composition template 110, which includes at least one unresolved element, is a document component that may be selected from a components container to serve as the top-level or root document component 104 for a corresponding composition model 112. As discussed in more detail below in one embodiment, the "family" in the "header" section of the root document component may be used to identify the composition model 112 that it refers to. In one embodiment, the composition model 112 may be stored with the composition template in each components container in which they are used for producing a rendered document instance 114. Further as shown in FIG. 1, an object 116N may be associated with a components container 106N, where the rendered document instance 114N describes the components of the object 116N. Advantageously, the rendering service 108 may be used to produce a plurality of component specific rendered documents 114 that correspond to a plurality of objects 116 using a single composition template 110 and model 112, where the various document components 104 used to render the different document instances 114 are stored in their corresponding components containers 106.

At one stage of its operation, the rendering service 108 constructs the rendered document instances 114 using recursive de-referencing to resolve unresolved elements, starting from the composition template 110 (i.e., the root document component). The service 108 carries out recursive de-referencing using the composition model 112 to help resolve "loosely coupled references" to other document components that appear as unresolved elements of a document component. A loosely coupled reference indirectly references a document component within another document component using the composition model 112. That is, a document component with a loosely coupled reference does not refer directly to a document component (e.g., by name or by location). Instead, a document component with a loosely coupled reference refers to other document components using the composition model 112. Advantageously, the use of loosely coupled references in document components permit (a) a document component to be replaced by another document component, (b) a document component to be split into several (sub) document components, or (c) several document components to be merged into a single document component, without requiring any modification to those document components identified using the loosely coupled references.

The various embodiments of document processing system described herein may be either centralized or distributed. In a centralized environment, available document components are registered or register themselves in a centralized component registration service 102, which may entail copying their interfaces, which in one embodiment is set forth in the header section of document components, in the component registry 103. Further, the dereferencing of unresolved elements that is performed by the rendering service 108 may be performed in the centralized environment. Alternatively, in a distributed environment, each component container associated with each physical object 116 together may include a separate instance of the registration service 102 and/or the rendering service 108. In yet another embodiment, the rendering service 108 may operate without a registration service 102 by either incorporating the registration functions and/or operating without the benefit of some or any prior registered document components (at the expense of possibly encountering performance degradations during the rendering process).

B. Composition Model

In accordance with one feature of the document management system, the composition model 112 describes a model for composing all possible component parts of the different configurations of the object 116. The composition model 112 specifies a terminology and a structure. The terminology used in the composition model 112 defines the possible "facet" of the object 116 (e.g., the name of a component part of an object). The structure of the composition model 112 specifies relations between the possible facets of the object 116.

Figure 2:
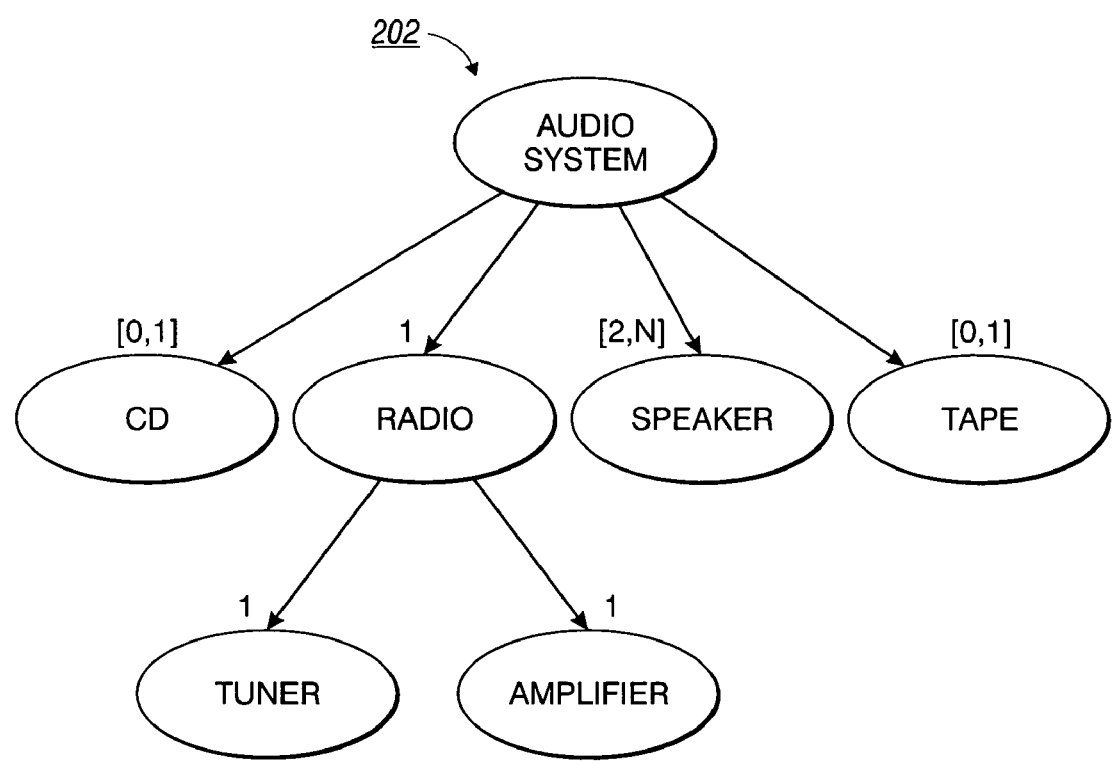
FIG. 2 illustrates an example of a composition model.

FIG. 2 illustrates an example of a composition model 112 shown in FIG. 1 (or a part thereof) which defines the facets of an audio system. In the embodiment shown in FIG. 2, the composition model 202 defines a hierarchical structure (although it need not be) using a directed acyclic graph, which in its simplest form is a tree. Each node of the composition model 202 specifies a facet of the audio system, which is associated with a cardinal set. The links between the nodes specify their relations and the cardinal set of each node specifies the allowed number of units of the facet for all possible configurations (e.g., "1" means one unit required, "[0,1]" means zero or one unit allowed, "[2,N]" means 2 or more units allowed, etc.).

In one embodiment, facets of the graph shown in FIG. 2 are related through a "contains" relation. The cardinal of the "contains" relation expresses different configurations of the facets (e.g., audio system contains 0 or 1 CD, 1 radio, 2 or N speakers, and 0 or 1 tape). In alternate embodiments, other relations may be added to extend the composition model 202 shown in FIG. 2, such as, "uses", "controls", or "replaces".

C. Document Components

As discussed above with reference to FIG. 1, the document components 104 forming part of one or more components containers 106 may contain one or more unresolved elements that are resolved by the rendering service 108 using recursive de-referencing starting from a top-level document component (i.e., the composition template 110). Each document component 104 may describe one or more parts of an object or family of objects 116 (e.g., a radio system).

FIG. 3 illustrates an example of a document component 302, which includes a header section and a body section. The header section, which holds the interface description, may include one or more of the following elements encoded in XML: (a) a "family" which refers to one or several parts making up the component or family of components (e.g., the family of systems referred to as "AudioPro_System"); (b) a "title" which specifies what may be a title of the component (which may, in addition, be the title of the rendered document when that component is chosen as the root component) (e.g., "System Five Audio"); (c) a list of "provisions" that each describes a facet in the composition model 112; (d) a list of "anchors" (or anchor points) that each specify a reference to selected parts of the document component (e.g., summary, detailed specification, etc.); (e) a "one-liner" that summarizes the component; and (e) a set of "attributes" that specify qualities of the "provisions" described in the document component. The "family" element defined in the header section of the root document component or composition template 110 may be used to determine which composition model 112 is referred to by the composition template 110. In the event a composition template does not refer to the root element of the "family" of the composition model (e.g., audio system in FIG. 2), the one or more "provisions" elements defined in the header section of the composition template may be used to identify which subset of facets in the composition model should apply.

In the example document component 302 shown in FIG. 3, the body section of the document component are specific to the "AudioPro_System" product family as it relates to the provision "audio system". In one aspect of this embodiment, the template registration service identifies the document component 302 when the facet "audio system" in the composition model 112 matches a "provision" of a document component registered in the component registry 103. In another aspect of this embodiment, the defined "family" element "AudioPro_System" in the header section of a document component may be used to identify a composition model 112 when the document component 302 is used as a root document component.

Further, in the example document component 302, the anchors "overview" and "SystemParts" listed in the header section and present in the body section are used by the rendering service 108 to resolve incoming references. Each anchor allows a selected (or delineated) section in the body of the document component to be rendered. As set forth in more detail below, the resolution of one unresolved element may introduce one or more additional elements to resolve (e.g., as shown in FIG. 3 as "{unresolved element}"). Once all unresolved elements have been resolved in a rendered document 114, a composition template 110 is effectively "de-referenced" from all document components that it references (as specified directly or as specified indirectly in a referenced document component). An unresolved element may take on a number of different forms, including an object or a method. An object specifies content from another component, whereas a method may be either an in-line method (i.e., where the rendering service considers the function undefined) or a pre-defined method (i.e., where the rendering service considers the function already defined).

D. Document Rendering

In one operational embodiment, the rendering service 108 produces a rendered document 114 while being loosely coupled to one or more document components, where the document components may refer to each other through unresolved elements. The de-referencing of unresolved elements is performed using lookup functions that identify document components either using a component registry 103 or by accessing directly a components container 106 that specifies the components for an instance of a rendered document 114, thereby maintaining the notion of a loose coupling between document components. In effect, each document component 104 declares "provisions" that correspond to facets in one or more composition models.

More specifically, the rendering service 108 de-references unresolved elements (which may include reference function, specified using a "transciude" operation, or content section identifiers, specified using "anchors", as described in more detail below) in a composition template 110 (i.e., the root document component 104) by carrying out different lookup functions that locate document components 104 (from the selected components container 106) with "provisions" exported in its header section that satisfy "facets" of offspring in its associated composition model 112.

Figure 4:
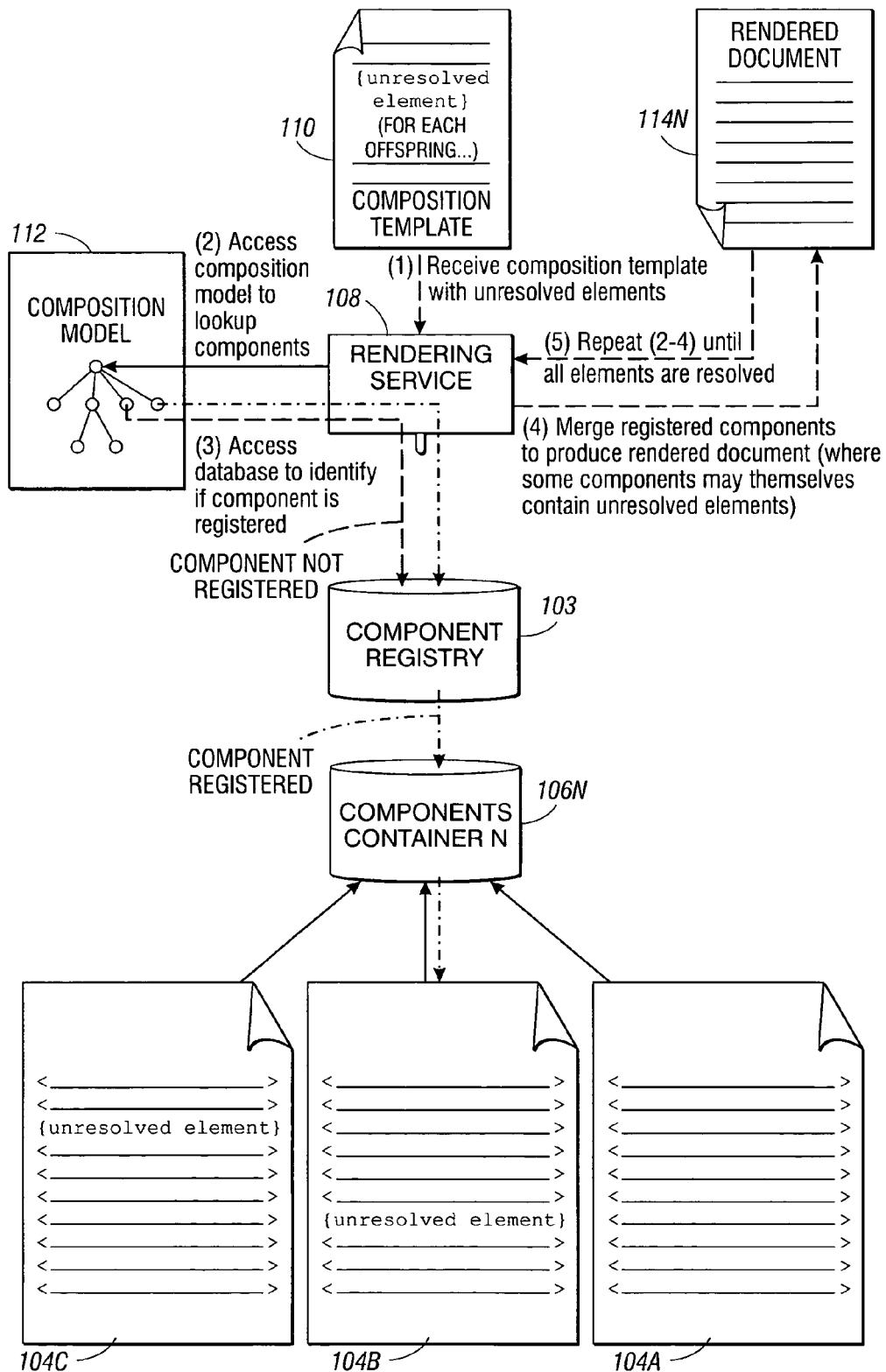
FIG. 4 illustrates operating details of the rendering service shown in FIG. 1.

FIG. 4 illustrates operating details of the rendering service 108, which includes a dereferencing service to recursively analyze unresolved elements identified in the composition template 110 (that serves as the root element or document component in rendering the document 114N). Except for unresolved elements, the content of the composition template is used to define the first iteration of the rendered document 114N. As unresolved elements are processed, new unresolved elements may be introduced, which in turn are recursively processed. This recursive dereferencing of unresolved elements continues until none remain to be processed (or alternatively until a predefined number of levels of recursion have been reached). The failure to resolve an unresolved element results in an undefined element that may either be ignored or result in the generation of a warning message or a series of actions that may, for example, be defined in the document component specifying the unresolved element.

Generally, the document rendering functions performed by the service 108 may be summarized as follows. Initially, available document components are registered using the registration service 102 to define a set of registered components in component registry 103. Once a composition template 110 has been received to be rendered (or a components container 106N in which it may be stored), the rendering service 108 processes the composition template 110. When an unresolved element is encountered while processing the composition template, the rendering service uses the component registry 103 to find document components in the container 106 that satisfy the composition template 110 and composition model 112.

In certain embodiments, a lookup service is searching for document components in the corresponding components container 106 accesses a composition model to identify all offsprings of a facet of the composition model 112. Document components 104 corresponding to the offsprings of the facet are then searched for in the component registry 103. (The registered presence of the document component in the corresponding components container indicates the presence of the facet in the object.) The lookup service may either form part of the rendering service or the registration service 102. For example in the audio system composition model shown in FIG. 3, an unresolved element designating the composition model's first level offspring (e.g., the facets "CD", "radio", "speaker", and "tape") will invoke a search of the component registry 103 to identify those facets of the composition model 112 that form part of the corresponding components container 106. As set forth above, in alternative embodiments the document components forming part of a components container 106 are not pre-registered in the component registry 103, thereby requiring the lookup service to search directly in a specified components container for document components matching the facets in the composition model.

Once the document components satisfying a composition template and composition model have been accessed, the necessary information is retrieved from the document components to process the unresolved elements of the composition template. The rendering service 108 continues to recursively dereference unresolved elements as they are added through the resolution of other unresolved elements. Once all unresolved elements have been processed by the rendering service, a rendered document is produced that merges elements in the document components that form part of the components container 106 corresponding to the rendered composition template 110.

Figure 5:
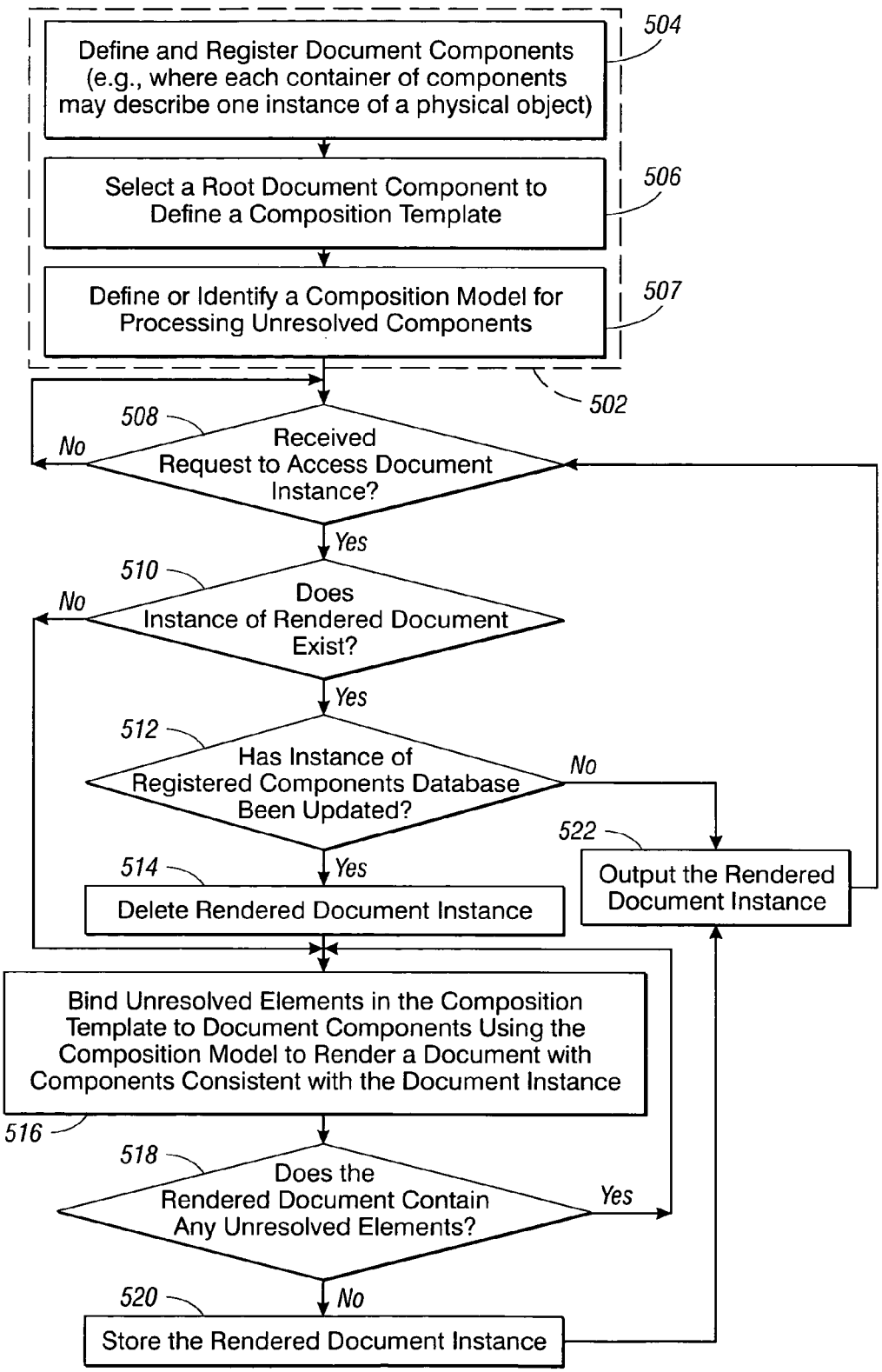
FIG. 5 is a flow diagram that sets forth one possible sequence of operations performed by the document management system shown in FIG. 1.

FIG. 5 is a flow diagram that sets forth one possible sequence of operations performed by the document management system shown in FIG. 1. Initially during an initialization phase (at 502), document components 104 are defined and registered using service 102 in the component registry 103 (at 504). The components may form part of one or more containers 106 that describe one or more instances of different objects that are described using a composition template 110, which is a document component selected as the root (at 506). Further during the initialization phase, a composition model is defined or identified (e.g., using the "family" element of the header of the root document component) that is used to process unresolved components in the composition template (at 507).

During the execution phase which follows the initialization phase, a process waits for requests to access a rendered document describing a document instance 114 (at 508). The access may be initiated by, for example, a user specified operation directed at a document instance (e.g., printing, viewing, transmitting, and storing) requiring access to the document instance. A document instance is described using a composition template, a composition model, and a container 106 of document components 104 (which may store the composition model and the composition template associated with the document instance). (The rendered document describing the document instance 114 changes when changes are made to the set of document components 104 in the container 106.) If an instance of the rendered document exists (at 510), then a determination is made as to whether any document components forming part of the container describing the document instance have been updated (at 512). If a document component has been updated (i.e., added, removed, and/or changed) in the container, then the existing instance of the rendered document is deleted (at 514).

When no instance exists (at 510), the current instance has been deleted (at 514), or unresolved elements remain in the rendered document (at 518), then unresolved elements in the composition template 110 are processed through a binding operation that associates the unresolved elements with document components in the container associated with the composition template (at 516). Such binding operation may result in the addition of unresolved elements from the document components 104 introduced after recursively dereferencing the unresolved elements that are loosely coupled through the composition model 112. Once all unresolved elements have been recursively de-referenced (at 518), an instance of the composition template and model is rendered using the content set forth in the specified container. The instance of the rendered document is stored (at 520) and output at (522) to define a rendered document instance.

Optionally before rendering the document (at 520), the textual content of the document instance may be linguistically processed to provide corrections or alerts for identified spelling errors, grammatical errors, anaphoric errors, and/or semantic incoherence (for details of one possible embodiment, see U.S. patent application Ser. No. 11/013,366, "Smart String Replacement"which is incorporated herein by reference).

E. Detailed Embodiment

In one embodiment, documents are rendered using a document markup language (e.g., XML). Also in this embodiment, methods (or reference functions) are expressed using an interpreted, interactive, object-oriented programming language (e.g., Python). It will be appreciated by those skilled in the art that the methods and syntax set forth in this embodiment may operate independent of the selected host document markup language (e.g., XML) or programming language (e.g., Python), and any number of alternate markup languages or programming languages may be used to carry out the functions and features of the disclosed document management system.

Further in this embodiment, the markup language used to define the document components shown in the FIGS. 9-15 is XML, in which reference functions are encoded in CDATA sections that are identified by the tag name <transclude>. Further in this embodiment, the reference functions are implemented in the execution environment using the Python programming language. Example constructs of such reference functions are defined in Tables 1-3, which may alternatively be defined in alternate programming languages.

TABLE 1

| Construct | Description |
|---|---|
| Variables | Variables may be used to carry context information between different parts of a document component, and may be assigned structured data. In one embodiment, variables are un-typed and elements of structured data are accessed using a "dot" notation (e.g., myVariable.name) or indices for a list (e.g., myVariable[1]). |
| Pre-defined Objects | The objects set forth in Table 2 are pre-defined and initiated in the execution environment and made available from within a document component. |
| Pre-defined Methods | The methods set forth in Table 3 are pre-defined methods made available in the execution environment. |
| Structured Objects | Structured objects specify elements in document components that correspond to elements of the document components (e.g., myDocument.title is a string that holds the "title" element of myDocument). |
| Anchor Objects | Anchor objects specify elements in document components that have a name and a value element (e.g., myDocument.anchors is a list of anchors, the elements of which may be individually accessed through methods, such as, myDocument.getAnchor("overview")). |
| Conditions and loops | Conditions and loops are control constructs that may, for example, be if-then-else conditions or for-while loops. |

TABLE 2

| Object | Description |
|---|---|
| theFamily | A string that holds the name of the family of the presently executed document component. |
| theDocuments | A collection of structured objects that represent those document components from a family that are currently available or visible (i.e., the document components within the same components container 106). |
| theStructure | The composition model which represents the family (i.e., offspring) of the presently executed document component (i.e., composition model 112). |

TABLE 3

| Method | Description |
|---|---|
| offspring( ) | The offspring method operates on parts of the composition model (from theStructure object, which is the composition model). The method takes as arguments the name of a node (or facet) in the composition model and an integer specifying depth and returns a set of node (or facet) names. The name specifies the node (or facet) that corresponds to the name. The integer indicates a depth to be explored from the named node (or facet). (e.g., theStructure. offsprings('car', 1)) |
| lookup( ) | The lookup method operates on a collection of document components to select a subset based on selection criteria given as arguments. The method takes two arguments: a string containing the name of a document component element (e.g., "provisions"); and, optionally, a list of values to match (in disjunction) with the document component element. (e.g., theDocuments.lookup ('provisions', theStructure.offsprings ('audio system', 1)): if not ('radio' in component. provisions)) |
| insertTxt( ) | The insertText method is the only method of those presented in this Table that produces content for the rendered document. The method operates by inserting the value of its argument into the document at the place where it appears. (e.g., insertTxt(radiocomp[0].title)) |
| getAnchor( ) | The getAnchor method enables the identification of variable data that is delineated by anchor points in a document component (e.g., insertTxt(myDocument.getAnchor ("overview")) |

Examples of the constructs presented in Tables 1-3 follow:

The construct "theStructure.offsprings('radio',1)": returns a list of system facets, which in this example returns the facets at the first level below "radio" in the example composition model shown in FIG. 2 (i.e., "tuner" and "amplifier").

The construct "theDocuments.lookup('provisions',['radio', 'speaker'])": returns a list of document components out of theDocuments with "radio" or "speaker" specified in their list of "provisions".

The construct "theDocuments.lookup('provisions', theStructure.offsprings ('audio system',2))": applies the lookup method to the results returned from the offsprings method, which in this example returns the set of document components that describe the facets of one or two levels down from the "audio system" facet shown in FIG. 2.

The construct "for component in theDocuments.lookup ('provisions', theStructure.offsprings ('audio system', 1)): insertTxt('<li>'+component.title +'</li>')": inserts a list of content describing all first-level facets of the composition model (e.g., parts "CD", "radio", "speaker", "tape" as shown in FIG. 2) into the rendered document such that each list element is specified using the <title> defined in the header of the document component matching each facet.

The construct "for component in theDocuments.lookup ('provisions', theStructure.offsprings('audio system', 1)): insertTxt (component.getAnchor ('overview')): inserts a list of content describing all first-level facets of the composition model (e.g., parts "CD", "radio", "speaker", "tape" as shown in FIG. 2) into the rendered document such that each list element is specified using the "overview <anchor> section defined in the document container corresponding to each facet.

These example constructs illustrate various features and advantages of the document management system described herein, which include: a loose coupling between component parts, context aware document collections, de-referencing operations to transform a reference (possibly using recursion) into rendered content, control constructs that permit iterations, and variable content. More specifically, the example constructs illustrates the document management system's advantages and features as follows:

- A loose coupling between system parts is expressed through the combination of the "lookup" and "off-springs" constructs.
- A context aware document collection is expressed through "theDocuments" collection (which is provided by the execution environment and which contains references to the documents available in the current container).
- De-referencing is expressed through the combination of the "inserlText" function and the ability to access elements (such as anchors) of the document components.
- Control constructs such as the "for" construct may be used to iterate through the facets described in a composition model to determine if they form part of the rendered document.
- Variable content is expressed in a document component using one or more <anchor> statements that can be used to define all or selected parts of the content describing a facet in a document component (e.g., see FIG. 8 which defines anchor points for "all", "overview", and "SystemParts" of a car).

FIGS. 6-16 illustrate an example of the detailed embodiment using the constructs defined above. Contents of a composition template 110 and a composition model 112 shown in FIG. 1 are illustrated in this example in FIGS. 8 and 16, respectively. Contents of an initial components container 106 describing a physical object 116 is defined in this example using the document components set forth FIGS. 9, 11, 13, and 15 (where each Figure sets forth one document component). In processing the example composition template shown in FIG. 8 (for root component "car"), the example composition model in FIG. 16 (for "car"), and the components container defined by the document components in FIG. 9 (for component "engine"), FIG. 11 (for component "audio system"), FIG. 13 (for component "speaker"), and FIG. 15 (for component "amplifier"), the rendering service 108 (shown in FIG. 1) produces the rendered document shown in FIG. 6 with components that include an audio system (with speakers, and an amplifier) and a GPL engine.

Continuing with the example shown in FIGS. 6-16, the contents of the initial components container is modified to define an updated components container. The contents of the components container (with components set forth FIGS. 9, 11, 13, and 15) is modified either manually, semi-automatically, or automatically to reflect changes made to the object, which in this example is a car that the rendered document shown in FIG. 6 describes. In one instance of this example, the initial components container is modified to define the updated components container by substituting the "engine" document component shown in FIG. 9 for the "engine" document component shown in FIG. 10, which corresponds to the substitution of a "GPL Engine" for a "Diesel Engine" in the "car" object. Further in this example, the "radio" document component shown in FIG. 12 and the "cd-player" document component shown in FIG. 14 are added to the initial components container to define the updated components container, which corresponds to the addition of a radio and a CD player to the audio system of the "car" object. Upon detection of changes to the components container and/or upon requested access to the rendered document shown in FIG. 6, the rendering service 108 (shown in FIG. 1) produces the rendered document shown in FIG. 7 with components that include a radio tuner and a cd-player with its audio system (that already included speakers and an amplifier) and a diesel engine (that replaces a GPL-engine).

As shown in rendered documents in FIGS. 6 and 7, the document management system 100 shown in FIG. 1 facilitates the generation of new documentation to reflect changes made to an object (e.g., a car) described using document components. In the example rendered documents illustrated in FIGS. 6 and 7, the addition of content to the rendered document shown in FIG. 7 describing a radio tuner and a CD player is achieved through the addition of document components describing the radio tuner (shown in FIG. 12) and the CD player (shown in FIG. 14) to the container associated with the composition template and composition model used to describe the object. Further in the example rendered documents illustrated in FIGS. 6 and 7, the introduction of content in the rendered document 7 describing a diesel engine is achieved through the substitution of the document component describing the GPL engine (shown in FIG. 9) for the document component describing the diesel engine (shown in FIG. 10) in the container associated with the composition template and model used to describe the object F. Dynamic Document Management Referring again to FIG. 1, the system 100 may be advantageously used for dynamically managing the documentation of physical objects (e.g., cars, systems, parts, etc.) that are built from any number of interchangeable components. The combination of components (and the number of features each component may have) that define an object may change over its life, thereby requiring documentation to be updated to accurately reflect the new makeup of the object. Examples of objects include industrial products that are built in a multitude of configurations (e.g., cars, printers, home entertainment systems, etc.). Other examples, include manufacturing plants that may be defined according to one general specification that may vary in the number and kind of components that make up the plant.

In one embodiment, objects are tagged with smart tags that may be implemented using RFID tags or with Smartcard technology. Such smart tags (e.g., tag 118 shown in FIG. 1 on object 116N) record the documentation elements (i.e., composition template, composition model, container, and rendering service corresponding to an object) necessary to render a document 114N describing the components of the object 116N. The documentation elements may be stored either fully or partially (e.g., by referencing information stored remotely through networks) in the smart tags 118. Further, the documentation elements recorded in the smart tags may be dynamically modified as new components of an object are changed or added by updating the document components 104 recorded in the container 106 describing the object 116.

The updates to the container may be performed either manually or automatically or semi-automatically through the detection of smart or numeric tags that may be identified by an electronic tag reader. In one embodiment, the electronic tag contains an identifier that permits the rendering service 108 to know the properties and content of a document component 104. An example system for identifying and tracking tagged documents is described in U.S. Patent Nos. incorporated herein by reference: U.S. Pat. Nos. 6,542,083; 6,340,931; 6,422,474; 6,342,830; 6,573,916; 6,446,208. Alternatively, the component may be marked with an identifier (e.g., using barcode or glyph technology) that may be scanned. Further, glyph technology may be used to encode the content of the document component that is in turn scanned in and recorded in the container 106N corresponding to the object 116N.

As illustrated in the detailed example shown in FIGS. 6-16, during the life of a car maintenance or enhancements may be made that involve changing its motor from gas to diesel, and/or adding a radio tuner and a CD player to its audio system. In accordance with the document management system 100, a document container 106N initially has stored therein the document components shown in FIGS. 9, 11, 13, and 15, which describe the initial instance of the car (e.g., gas engine and no radio tuner or CD player). After changing the engine the document component shown in FIG. 9 is replaced with the document component shown in FIG. 10, and after adding a radio tuner and a CD player the document components shown in FIGS. 12 and 14 are added. Once the composition template 110 is accessed for the car after the updates are made, new documentation is rendered to produce a rendered document 114N shown in FIG. 7, which replaces the outdated rendering shown in FIG. 6.

In another embodiment, the smart tags 118 are also used to track data related to use and/or performance of one or more components. For example, the smart tags 118 may be used to track one or more of a component's duration of use, time of use, and power/acceleration exerted during use. Such tags 118 may in a further embodiment emit signals indicating a malfunction or an approaching end-of-life (e.g., a replacement part will be needed) based on the recorded use data. Alternatively such tags 118 may be used to record and track the location and time when shocks occur to components or the object embedding the components (e.g., using an accelerometer to measure the shock, a GPS (global positioning system) to measure the position, and a clock to measure the time). Such a system may be used with the shipment of objects to insure that objects did not withstand any unreasonable shocks during transit and, if so, when and where in transit the shock occurred. Further, the number and degree of shocks recorded may advantageously be used to assess whether the condition of the packaging (e.g., shipping box) in which the object was shipped may be reused for a subsequent shipment. Some or all of the tracked information of a component may be recorded in a document component forming part of the components container used to construct a rendered document describing the object.

In summary, the use of smart tags and/or electronic tags and/or a marked identifiers may be used to enable dynamic document management, where document components are updated in containers to reflect changes made to the object itself. Advantageously, documentation concerning an object is dynamically rendered as updates to document components are made to a container to reflect the fact that certain parts have been added or changed after a given period of use or after certain maintenance actions have been accomplished.

G. Miscellaneous

Those skilled in the art will recognize that a general purpose computer may be used for implementing certain elements of the document processing system described herein. Such a general purpose computer would include hardware and software. The hardware would comprise, for example, a processor (i.e., CPU), memory (ROM, RAM, etc.), persistent storage (e.g., CD-ROM, hard drive, floppy drive, tape drive, etc.), user I/O, and network I/O. The user I/O can include a camera, a microphone, speakers, a keyboard, a pointing device (e.g., pointing stick, mouse, etc.), tag reader, barcode scanner, and the display. The network I/O may for example be coupled to a network such as the Internet. The software of the general purpose computer would include an operating system.

Further, those skilled in the art will recognize that the forgoing embodiments may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-usable media such as memory devices or transmitting devices, thereby making a computer program product or article of manufacture according to the embodiment described herein. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the embodiments as set forth in the claims.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the disclosure as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for generating instances of documents, comprising:
   defining a container with a set of document components;
   defining a composition template that specifies one or more unresolved elements;

defining a composition model that specifies a set of all possible facets that may be used to render the composition template;

using the composition model to bind the one or more unresolved elements in the composition template with the set of document components in the container; and producing different instances of a rendered document by (i) altering the set of document components in the container and (ii) using the composition model to re-bind the one or more unresolved elements in the composition template with the document components in the altered set of document components in the container.

2. The method according to claim 1, wherein the set of documents in the container is altered by performing one or both of adding document components to the container and removing document components from the container.

3. The method according to claim 1, further comprising accessing the rendered document in response to a user-specified operation directed at the rendered document.

4. The method according to claim 3, wherein a user specified operation is one of printing, viewing, and archiving.

5. The method according to claim 1, wherein each document component exports provisions through a common interface that are associated with facets in the composition model.

6. The method according to claim 1, further comprising registering the documents components of the container in a component registry using a lookup service, wherein the composition model is used to bind the one or more unresolved elements by querying the lookup service to identify facets specified in the composition model that are registered in the component registry.

7. The method according to claim 1, further comprising associating the composition model, the composition template, and the container with an object.

8. The method according to claim 7, further comprising adding or removing the document components in the container depending on whether component parts are added or removed from the object.

9. The method according to claim 8, wherein said associating is performed by marking the object with an identifier or a description of the composition model, composition template, and components container.

10. The method according to claim 8, wherein said associating is performed by recording in a smart tag an identifier to or a copy of, the composition model, composition template, and components container.

11. The method according to claim 10, wherein at least one document component in the set of document components in the container records data related to the object's use or performance.

12. The method according to claim 1, wherein said using the composition model to bind the one or more unresolved elements in the composition template with the set of document components in the container further comprises: adding additional unresolved elements to the composition template; recursively resolving the additional unresolved elements with the set of document components in the container.

13. The method according to claim 1, wherein said using the composition model to bind the one or more unresolved elements in the composition template with the set of document components in the container further comprises: inserting content from document components in the container into the rendered document.

14. The method according to claim 13, wherein said inserting further comprises inserting selected parts of the content in document components by referencing anchor points in the document components.

15. The method according to claim 1, wherein the different instances of a rendered document are produced using linguistic processing to identify spelling errors, grammatical errors, anaphoric errors or semantic incoherence.

16. The method according to claim 1, wherein binding the one or more unresolved elements in the composition template further comprises providing transitive closure from the composition template by dereferencing the one or more unresolved elements therein using the document components in the container.

17. The method according to claim 1, further comprising using one or more elements stored in a header of the composition template to identify the composition model and the facets defined therein that are used for binding the one or more unresolved elements in the composition template.

18. The method according to claim 1, wherein the document components define variable data by exporting one or more anchor points that may be referenced by other document components.

19. An apparatus, comprising:
a memory for storing processing instructions for generating instances of documents; and a processor coupled to the memory for executing the processing instructions;
the processor in executing the processing instructions:
defining a container with a set of document components;
defining a composition template that specifies one or more unresolved elements; defining a composition model that specifies a set of all possible facets that may be used to render the composition template;
using the composition model to bind the one or more unresolved elements in the composition template with the set of document components in the container; and
producing different instances of a rendered document by (i) altering the set of document components in the container and (ii) using the composition model to re-bind the one or more unresolved elements in the composition template with the document components in the altered set of document components in the container.

20. An apparatus for generating instances of documents, comprising:
means for defining a container with a set of document components;
means for defining a composition template that specifies one or more unresolved elements;
means for defining a composition model that specifies a set of all possible facets that may be used to render the composition template;
means for using the composition model to bind the one or more unresolved elements in the composition template with the set of document components in the container; and
means for producing different instances of a rendered document with (i) means for altering the set of document components in the container and (ii) means for using the composition model to re-bind the unresolved elements in the composition template with the document components in the altered set of document components in the container.

* * * * *